United States Patent
Mizrahi

(10) Patent No.: US 11,314,250 B2
(45) Date of Patent: Apr. 26, 2022

(54) METHODS AND SYSTEMS FOR DEFINED AUTONOMOUS SERVICES

(71) Applicant: Jacob Mizrahi, New York, NY (US)

(72) Inventor: Jacob Mizrahi, New York, NY (US)

( * ) Notice: Subject to any disclaimer, the term of this patent is extended or adjusted under 35 U.S.C. 154(b) by 338 days.

(21) Appl. No.: 16/116,895

(22) Filed: Aug. 29, 2018

(65) Prior Publication Data

US 2020/0073380 A1 Mar. 5, 2020
US 2021/0286358 A9 Sep. 16, 2021

Related U.S. Application Data

(60) Provisional application No. 62/696,827, filed on Jul. 11, 2018.

(51) Int. Cl.
| | |
|---|---|
| G05D 1/00 | (2006.01) |
| G05D 1/02 | (2020.01) |
| G06Q 20/14 | (2012.01) |
| B60L 50/50 | (2019.01) |

(52) U.S. Cl.
CPC ......... G05D 1/0088 (2013.01); G05D 1/0274 (2013.01); G05D 1/0291 (2013.01); G06Q 20/14 (2013.01); *B60L 50/50* (2019.02); *G05D 2201/0213* (2013.01)

(58) Field of Classification Search
CPC .. G05D 1/0088; G05D 1/0274; G05D 1/0291; G05D 1/0223; G05D 1/0276; G05D 1/0027; G05D 1/0214
See application file for complete search history.

(56) References Cited

U.S. PATENT DOCUMENTS

| | | |
|---|---|---|
| 5,715,399 A | 2/1998 | Bezos |
| 5,960,411 A | 9/1999 | Hartman et al. |
| 8,447,070 B1 | 5/2013 | Bozarth et al. |
| 8,678,321 B2 | 3/2014 | Bezos et al. |
| 10,082,793 B1 * | 9/2018 | Glaser ................ G01C 21/3423 |
| 10,248,120 B1 * | 4/2019 | Siegel .................. G05D 1/0223 |

(Continued)

FOREIGN PATENT DOCUMENTS

WO 2013/035060 A1 3/2013

OTHER PUBLICATIONS

International Search Report with the Written Opinion issued for corresponding International Application No. PCT/US2019/041498 dated Nov. 7, 2019.

(Continued)

*Primary Examiner* — Redhwan K Mawari
(74) *Attorney, Agent, or Firm* — Myers Wolin, LLC

(57) ABSTRACT

Methods and systems are provided for autonomous on-demand services that transport people products, or services from and to specific locations, and at specific times pre-defined within a specific geographically boundary. The "Defined Autonomous Services Platform" (DASP), creates, manages and executes a pre-planned program whereby an autonomous robot or fleet of autonomous robots that can consist of one or many Passenger Vehicle, Delivery Van, Commercial Truck, Robot Unit, Unmanned Ariel Vehicle (UAV), Drone, or other machine unit navigates land-based or aerial-based or maritime-based pre-defined routes within a geographical boundary, and perform a defined task or set of defined tasks completely in an automated way that requires no end-user intervention.

17 Claims, 6 Drawing Sheets

(56) References Cited

U.S. PATENT DOCUMENTS

| | | | |
|---|---|---|---|
| 10,482,471 B2 | 11/2019 | Herrington et al. | |
| 2013/0018766 A1* | 1/2013 | Christman | B60L 50/53 705/34 |
| 2013/0085625 A1* | 4/2013 | Wolfe | G06F 19/00 701/1 |
| 2014/0365258 A1* | 12/2014 | Vestal | G06Q 10/063114 705/7.15 |
| 2016/0116913 A1* | 4/2016 | Niles | G05D 1/0061 701/23 |
| 2016/0247106 A1 | 8/2016 | Dalloro et al. | |
| 2016/0301698 A1* | 10/2016 | Katara | H04L 63/102 |
| 2017/0123421 A1* | 5/2017 | Kentley | B60W 30/00 |
| 2018/0173219 A1* | 6/2018 | Lee | G05D 1/0088 |
| 2019/0050790 A1* | 2/2019 | Ferguson | G05D 1/0231 |
| 2019/0064806 A1* | 2/2019 | Nix | B60W 50/00 |
| 2019/0066409 A1* | 2/2019 | Moreira da Mota | G07C 5/0808 |
| 2019/0120643 A1* | 4/2019 | Schmell | G01C 21/3438 |
| 2019/0137290 A1* | 5/2019 | Levy | G01C 21/3461 |
| 2019/0197798 A1* | 6/2019 | Abari | G06Q 10/02 |
| 2019/0351895 A1* | 11/2019 | Ben-Ari | B60W 10/28 |
| 2020/0073380 A1* | 3/2020 | Mizrahi | G08G 1/207 |

OTHER PUBLICATIONS

Wikipedia, "1-Click," downloaded from the Internet URL: <https://en.wikipedia.org/wiki/1-Click>, pp. 1-4, Sep. 9, 2019.

* cited by examiner

FIGURE 4

| Program Date: Friday, June 22, 2018 (Tammuz 9, 5778) | | | Program Start Time [PST] (EST Zone-USA): 6:31 PM | | | * Max. Travel Speed [MTS] (miles/hr): 15 | | Stop Break Time [SBT] (mins): 5 | | Program Complete Time [PCT] (EST Zone-USA): 7:58 PM | | |
|---|---|---|---|---|---|---|---|---|---|---|---|---|
| Trip Path Id [TPI#] | Start Point Id [SPI] | Stop Point Id [SPI2] | Trip Start Time [TST] (time) | Tot. Path Dist. [TPD] (miles) | Cum. Path Dist. [CPD] (miles) | Act. Travel Time [ATT] (mins)* | Act. Cum. Travel Time [ACTT] (mins)* | Trip Stop Time [TST2] (time) | Process Action Type(s) | Planned Stop Break Time [PSBT] (mins) | Trip Complete Time [TCT2] (time) | Total Cum. Time [TCT] (mins) |
| 1 | A | B | 6:31 PM | 0.9 | 0.9 | 3.6 | 3.6 | 6:34 PM | Passenger | 5.0 | 6:39 PM | 8.6 |
| 2 | B | C | 6:39 PM | 1.1 | 2.0 | 4.4 | 8.0 | 6:44 PM | Passenger | 5.0 | 6:49 PM | 18.0 |
| 3 | C | D | 6:49 PM | 0.9 | 2.9 | 3.6 | 11.6 | 6:52 PM | Passenger | 5.0 | 6:57 PM | 26.6 |
| 4 | D | F | 6:57 PM | 1.4 | 4.3 | 5.6 | 17.2 | 7:03 PM | Passenger | 5.0 | 7:08 PM | 37.2 |
| 5 | F | A | 7:08 PM | 1.7 | 6.0 | 6.8 | 24.0 | 7:15 PM | Passenger | 5.0 | 7:20 PM | 49.0 |
| 6 | A | G | 7:20 PM | 0.6 | 6.6 | 2.4 | 26.4 | 7:22 PM | Passenger | 5.0 | 7:27 PM | 56.4 |
| 7 | G | J | 7:27 PM | 0.7 | 7.3 | 2.8 | 29.2 | 7:30 PM | Passenger | 5.0 | 7:35 PM | 64.2 |
| 8 | J | I | 7:35 PM | 1.4 | 8.7 | 5.6 | 34.8 | 7:40 PM | Passenger | 5.0 | 7:45 PM | 74.8 |
| 9 | I | A | 7:45 PM | 1.8 | 10.5 | 7.2 | 42.0 | 7:53 PM | Passenger | 5.0 | 7:58 PM | 87.0 |
| Program Trip Stops [PTS]: 9 | | | | Program Total Distance [PTD] (miles): 10.5 | | | | | Program Total Time [PTT] (mins): 87.0 | | | |

400  402  404  406  408

410 412 414 416 418 420 422 424 426 428 430 432 434 436

438  440  442

METHODS AND SYSTEMS FOR DEFINED AUTONOMOUS SERVICES

CROSS REFERENCE TO RELATED APPLICATIONS

This application is related to the U.S. provisional patent application No. 62/696,827, filed on Jul. 11, 2018, the disclosure of which is hereby incorporated herein by reference.

BACKGROUND

The invention embodiments consist of methods and systems used to provide for self-functioning autonomous services via The "Defined Autonomous Services Platform" (DASP), that enables the transport of people, products, and/or services from and to specific location(s), at specific time(s), and within a specific geographically boundary, and with active energy & power management that is all pre-defined and completely in an automated way that requires no end-user intervention, thereby enabling an approach that can be allied to religious special use-cases such as under the Judaism religion.

The strict observance of being "Shomer", observing the Sabbath (also know as Shabbos in Yiddish, or Shabbat/Shabat in Hebrew) and observing Jewish holidays as listed in the Torah is a benchmark for Orthodox practice and has merit and legal bearing on the way a Jew is seen by religious court regarding their affiliation to the Judaism religion. Shomer constitutes observing the Mitzvot (commandments) that includes performing specific duties as well as not performing prohibitions against specific activities of creation or creative acts (known as forms of Melacha), as well as restrictions on transporting objects and/or traveling from a private to the public domain (area) from times in the day such as from dawn (or sunrise) until sunset (or dusk) on specific day(s) as with the observation of Sabbath weekly. In addition, also under Halakha (Jewish law), there are other categories of activities prohibited on Sabbath with many of them also being restricted on the Jewish holidays.

Where as the invention embodiments are associated with transport as well as other related services which have traditionally been considered as prohibited activities for being Shomer, The "Defined Autonomous Services Platform" (DASP), implements various architectural design considerations to adhere to the general guidelines for an individual to being Shomer for Sabbath and Holidays. Traditional "Shomer" concerns being addressed include:
I. Autonomy: The "Defined Autonomous Services Platform" (DASP), allows for the ability to create, manage and execute a (or set of) pre-defined program(s) whereby an autonomous robot or fleet of autonomous robot units navigates land-based and/or aerial-based and/or maritime-based pre-defined route(s) within a geographical boundary, and performs a (or set of) pre-defined task(s) completely in an automated way that requires no end-user intervention. Furthermore, a pre-defined autonomous program would consists of functions such as scheduling, availability of use, routing, energy management, user identification, payment services, service validation & authorization, maintenance, field support services as other robotic business process automation handled by interconnected service providers.
II. Mobility Management: The "Defined Autonomous Services Platform" (DASP), allows for the ability for restricting operations of an autonomous robot or fleet of autonomous robot units to navigate land-based and/or aerial-based and/or maritime only within a geographical boundary "Eruv" (or geo-fence) that when defined integrates a number of private and public geographical regions into one larger private domain.
III. Energy & Power Management: The "Defined Autonomous Services Platform" (DASP): 1. Utilizes an autonomous robot or fleet of autonomous robots units operating with battery-powered systems as well as solid-state electronic components that automatically manages unit positioning, navigation, motion, control, maintenance as well as safety functions whereas traditional automotive units utilize motor-engine(s) that make use of combustion that consumes and/or burns (with fire) gasoline or petrol-based fuel. 2. A pre-defined program (or sets of programs) to be fully pre-planned and are managed whereas power & energy is distributed whereas source voltages, currents, resistances are actively managed without creating, opening or closing of electrical circuits, and energy requirements are maintained on a consistent basis regardless on use, or demand or physical weight loading.

SUMMARY

Whereas embodiment of the invention consists of methods and systems that enable an autonomous robot or fleet of autonomous robots to operate in a way that requires no end-user intervention and adhering to not performing prohibitions against specific creative acts (known as forms of Melacha) during specific times or days associated with being Shomer for Sabbath or Holidays under Orthodox Jewish law.

The "Defined Autonomous Services Platform" (DASP), that enables the transport of people, products, and/or services from and to specific location(s), at specific time(s), and within a specific geographically boundary; Functionality described includes managing end-to-end pre-planning, execution, and operations of a pre-defined program for an autonomous robot (or fleet of autonomous robots) that can consist of Passenger Vehicle(s), Delivery Van(s), Commercial Truck(s), Robot Unit(s), UAV(s), and/or Drone(s).

Furthermore, a pre-defined program fully consists of functions such scheduling, availability of use, routing, energy use & power consumption, service validation & authorization, user identification, payment services, service maintenance, or field support services, whereas it is connected to networks that consist of wire-line and/or wire-less system for communications as well as being interconnected to service providers that can various elements of operations, support, and active management functions as needed for operations of The "Defined Autonomous Services Platform" (DASP) and its capabilities provided.

BRIEF DESCRIPTION OF THE DRAWINGS

FIG. 4 is a summary table that depicts detailed steps and system parameters of a program plan to used by an autonomous robot or fleet of autonomous robots to transport people, products, and/or services from and to specific location(s), at specific time(s), and within a specific geographically boundary that are all pre-defined.

DETAILED DESCRIPTION

Figure 1:
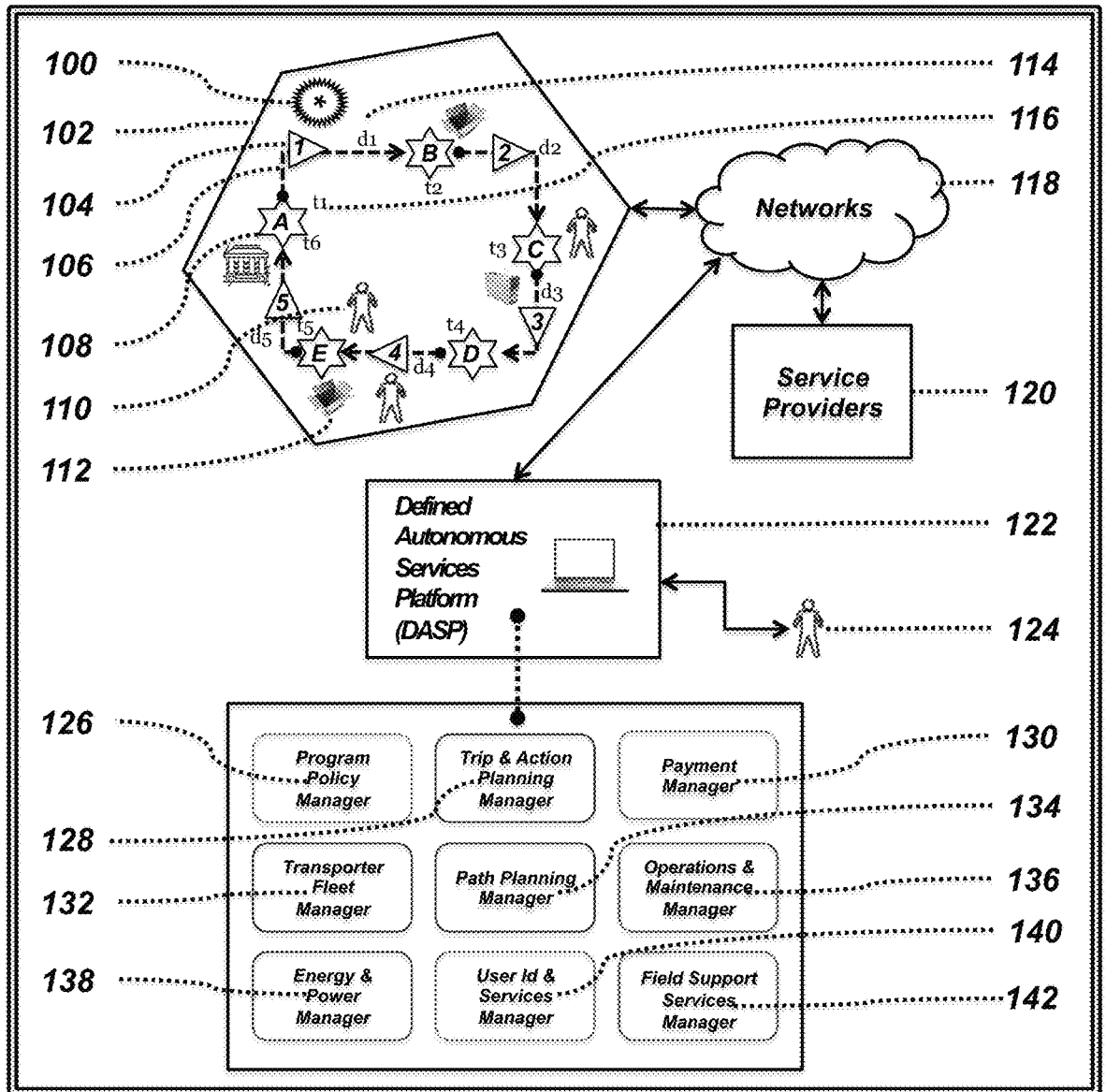
FIG. 1 is a diagram that depicts The "Defined Autonomous Services Platform" (DASP), and systems architectural design used to create, manage, and execute a pre-defined program(s) for an autonomous robot or fleet of autonomous robots which transport people, products, and/or services from and to specific location(s), at specific time(s), and within a specific geographically boundary that are all pre-defined.

FIG. 1 is a diagram that depicts The "Defined Autonomous Services Platform" (DASP), and systems architectural design used to create, manage, and execute a pre-defined program(s) for an autonomous robot or fleet of autonomous robots which transport people, products, and/or services from and to specific location(s), at specific time(s), and within a specific geographically boundary that are all pre-defined.

100: An autonomous robot such as a Passenger Vehicle, Delivery Van, Commercial Truck, Robot Unit, UAV, Drone, or other machine unit.

102: An Eruv is a geographically boundary (or geo-fence) that limits field activity or operations only within its area for 100 an autonomous robot(s).

104: A travel path identification number [i.e. 1,2,3,4,5 within FIG. 1 or 1,2,3,4,5,6,7,8,9,10 within FIG. 3], that is a unique identifier that indicts a specific travel path to be travelled to or from one pre-defined location to another.

106: A travel path corresponding to 104 a travel path identification number, and is a planned set of roads, surfaces, aerial, and/or maritime routes(s) to be travelled to get to or from one pre-defined location to another.

108: An originating or destination location point which is delineated by GPS position (three dimensional {X, Y, Z}, or two dimensional {X, Y} where Z=0) coordinates, street address, or some other location delimitation point as pre-defined within 106 a travel path [i.e. A, B, C, D, E within FIG. 1 Or A, B, C, D, E, F, G, H, I, J, K, L, M, N within FIGS. 3], and 102 Eruv which is a geographically boundary (or geo-fence) that limits field activity or operations only within its area.

110: An individual(s) that is (are) transported from one and another 108 an originating or destination location point, which is determined by a pre-defined program.

112: An object is (are) product(s), and/or a service(s) that is transported from one and another 108 an originating or destination location point, which is determined by a pre-defined program.

114: Distance of a travel path 106 (in miles or km units) which is the length of a planned set of roads, surfaces, aerial, and/or maritime route(s) to be travelled to get to or from one and another 108 an originating or destination location point to another [i.e. d1, d2, d3, d4, d5 within FIG. 1] which is determined by a pre-defined program.

116: Time (based on localized time zone, i.e. EST Zone-USA) when leaving or arriving from one and another 108 an originating or destination location point to another [i.e. t1, t2, t3, t4, t5, t6 within FIG. 1] which is determined by a pre-defined program.

118: "Networks" are wired and/or wireless communication systems(s), which provides telecommunication connectivity for transmitting data and/or information needed by one or more technology system components required for the "Defined Autonomous Services Platform" (DASP), any of its sub-components, and/or service providers to operate successfully.

120: "Service Providers" are external entities that provide technology system component(s) and/or services, and/or data and/or information needed by one or more technology system component(s) required for the "Defined Autonomous Services Platform" (DASP), or required by any of its sub-component(s).

122: The "Defined Autonomous Services Platform" (DASP), consists of system component(s) and/or sub-component(s) [as described within 124, 126, 128, 130, 132, 134, 136, 138, 140, 142] and/or systems provided by 120 Service Provider(s) that manages relevant functions and activities which are part of a program plan, which transport people, products, and/or services from and to specific location(s), at specific time(s), and within a specific geographically boundary that are all pre-defined.

124: "Operator" is an individual, or group of individual(s) that actively programs, operates, and/or maintains 122 The "Defined Autonomous Services Platform" (DASP).

126: "Program Policy Manager" is a subset of the 122 The "Defined Autonomous Services Platform" (DASP) which may be managed by 120 Service Providers, directs all system technical parameters and service guidelines for system component(s) and/or sub-component(s) [as described within 124, 128, 130, 132, 134, 136, 138, 140, 142] and/or systems provided by 120 Service Provider(s).

128: "Trip & Action Planning Manager" is a subset of the 122 The "Defined Autonomous Services Platform" (DASP), which may be managed by 120 Service Providers, defines the trip itinerary, travel path, logistics, and actions including 104 A travel path identification number, 106 A travel path, 108 an originating or destination location point as to be conducted during a program plan, 102 Eruv which is a geographically boundary (or geo-fence) that limits field activity or operations only within its area.

130: "Payment Manager", is a subset of the 122 The "Defined Autonomous Services Platform" (DASP) which may be managed by 120 Service Providers, handles pre-planned transactional payments and fee(s) to be collection for services executed completely in an automated way that requires no end-user intervention, fulfilling what is required for a program plan. Any and all payments rendered are made in advance and thereby operate in a way that requires no end-user intervention and adhering during specific times or days associated with being Shomer for Sabbath or Holidays under Orthodox Jewish law.

132: "Transporter Fleet Manager", is a subset of the 122 The "Defined Autonomous Services Platform" (DASP) which may be managed by 120 Service Providers, manages 100 An autonomous robot unit or fleet of autonomous robots allocation, setup, unit delivery or release to or from 108 originating or destination location point, 102 Eruv which is a geographically boundary (or geo-fence) that limits field activity or operations only within its area, unit maintenance, actions to be performed during services provided, required during, as well as certification & operations validation completely in an automated way that requires no end-user intervention which fulfills what is required for a program plan, and being Shomer for Sabbath or Holidays under Orthodox Jewish law.

134: "Path Planning Manager", is a subset of the 122 The "Defined Autonomous Services Platform" (DASP) which may be managed by 120 Service Providers, handles the tactical plan of operations for 106 A travel path planned that include set of roads, surfaces, aerial, and/or maritime routes (s) to be travelled to get to or from one pre-defined location; as well as 102 Eruv operation restriction completely in an automated way that requires no end-user intervention and also fulfills what is required for a program plan. Travel logistics that fall within 102 Eruv geographical boundaries during specific times or days is associated with being Shomer for Sabbath or Holidays under Orthodox Jewish law.

136: "Operations & Maintenance Manager", is a subset of the 122 The "Defined Autonomous Services Platform" (DASP) which may be managed by 120 Service Providers, handles all operations and maintenance duties (which may include robotic business process automation), completely in an automated way that requires no end-user intervention which fulfills what is required for a program plan, and being Shomer for Sabbath or Holidays under Orthodox Jewish law.

138: "Energy & Power Manager", is a subset of the 122 The "Defined Autonomous Services Platform" (DASP) which may be managed by 120 Service Providers, provides all energy and power management as well as control completely in an automated way that requires no end-user intervention, fulfilling what is required for a program plan. Also whereas energy and power consumption restriction is fully managed and is not impacted by weight or volume from 100 autonomous robot operations and/or services rendered where applicable would not change the amount of energy being consumed, and is powered by rechargeable battery fuel source(s). Also all power consumption management that are distributed and maintained on a consistent basis regardless on use, or demand or physical weight loading. In addition, operations are managed in a way that requires no end-user intervention and adhering during specific times or days associated with being Shomer for Sabbath or Holidays under Orthodox Jewish law.

140: "User Identification & Services Manager", is a subset of the 122 The "Defined Autonomous Services Platform" (DASP) which may be managed by 120 Service Providers, includes all user identification as well as authentications for services rendered via technologies (which may include facial/vocal recognition, fingerprinting/retina scan, and/or other methodologies) as required for system component(s) and/or sub-component(s) [as described within 124, 126, 128, 130, 132, 134, 136, 138, 142] and/or systems provided by 120 Service Provider(s) conducted completely in an automated way that requires no end-user intervention, fulfilling what is required for a program plan and thereby operate in a way that requires no end-user intervention and adhering during specific times or days associated with being Shomer for Sabbath or Holidays under Orthodox Jewish law.

142: Field Support Services Manager, is a subset of the 122 The "Defined Autonomous Services Platform" (DASP) which may be managed by 120 Service Providers, automatically handles any field maintenance duties required by the operations as well as emergency support alerting as required for system component(s) and/or sub-component(s) [as described within 124, 126, 128, 130, 132, 134, 136, 138, 140] and/or systems provided by 120 Service Provider(s) conducted completely in an automated way that requires no end-user intervention, fulfilling what is required for a program plan and thereby operate in a way that requires no end-user intervention and adhering during specific times or days associated with being Shomer for Sabbath or Holidays under Orthodox Jewish law.

Figure 2:
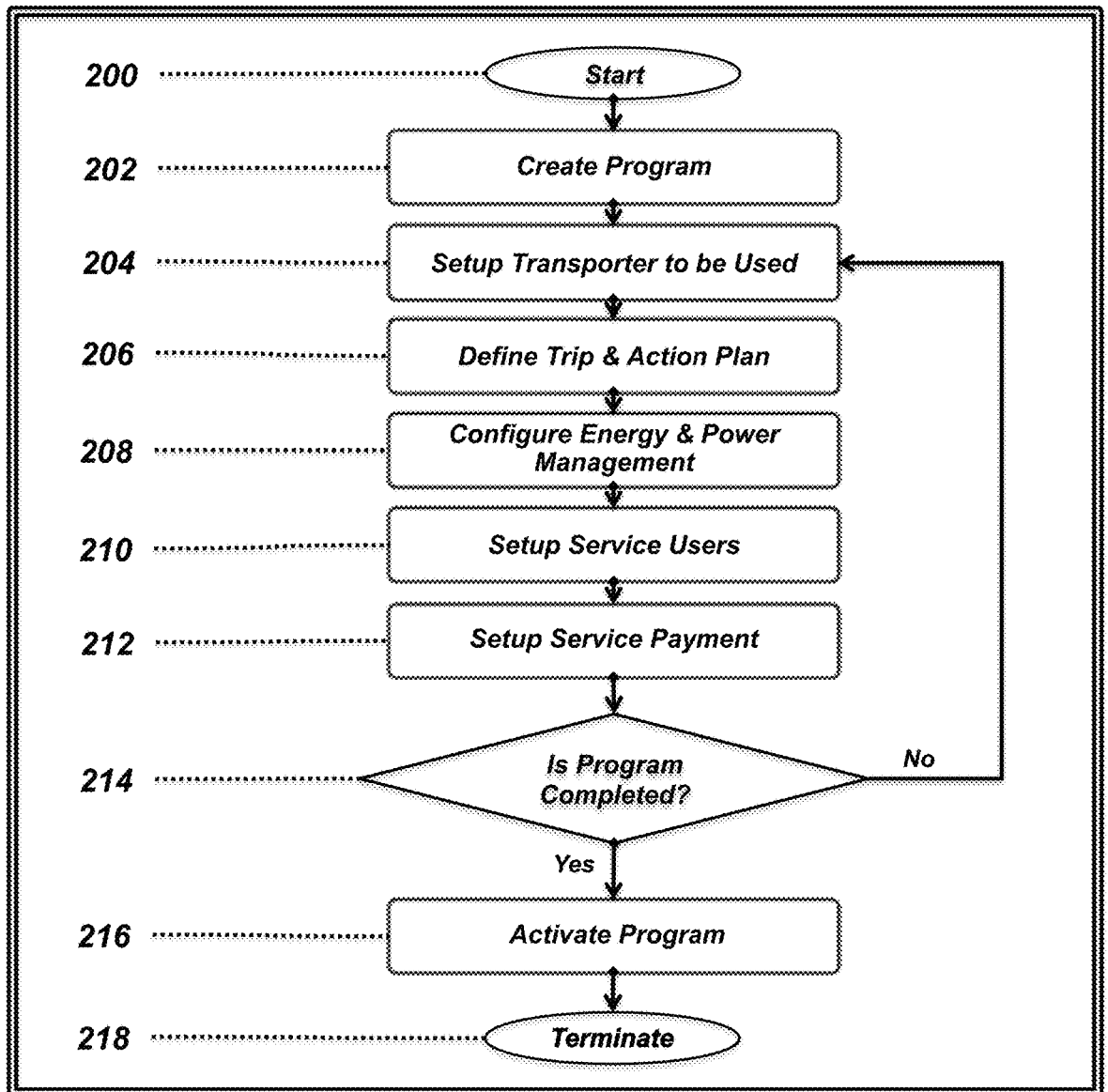
FIG. 2 is a process flow diagram that depicts how a program plan used by an autonomous robot or fleet of autonomous robots to transport people, products, and/or services from and to specific location(s), at specific time(s), and within a specific geographically boundary that are all pre-defined.

FIG. 2 is a process flow diagram that depicts how a program plan used by an autonomous robot or fleet of autonomous robots to transport people, products, and/or services from and to specific location(s), at specific time(s), and within a specific geographically boundary that are all pre-defined.

200: "Start" step, is the beginning of the Process to establish a pre-defined program plan that 122 The "Defined Autonomous Services Platform" (DASP) will execute.

202: "Create Program" step, established a template to define a pre-defined program plan that 122 The "Defined Autonomous Services Platform" (DASP) will execute based on technical parameters and service guidelines established by 126 Program Policy Manager, and 136 Operations & Maintenance Manager, and 142 Field Support Services Manager.

204: "Setup Transporter to be Used" step, is based on 132 Transporter Fleet Manager which includes the adding and configuration of an approved and certified 100 An autonomous robot to be used for a program that transports people, products, and/or services from and to specific location(s), and at specific time(s) that are pre-defined within a specific geographically boundary.

206: "Define Trip & Action Plan" step is the definition of Trip (Location points) & Action Plan which is a Sequence of events that take place at pre-defined locations as well as other actions within pre-defined set program based on 128 Trip & Action Planning Manager and 134 Path Planning Manager.

208: "Configure Energy & Power Management" step, includes configuration of all energy consumption and power management needs to adhere to requirements by 138 Energy & Power s Manager.

210: "Setup Service Users" step, includes configuration of all user(s) and payment(s) for use that adhere to requirements by 140 User Identification & Services Manager.

212: "Setup Service Payment" step includes configuration of all user(s) and payment(s) for use that adhere to requirements by 130 Payment Manager.

214: "Is Program Completed?" step, determines whether program plan entry is complete or if not, then additional programming is need to pre-defined, and sequence of steps previously executed starting from 204 Setup Transporter to be Use.

216: "Activate Program" step, establishes the program plan into live configuration for 122 The "Defined Autonomous Services Platform" (DASP), to be executed.

218: "Terminate" step, is the completion of the Program Plan Creation Process.

Figure 3:
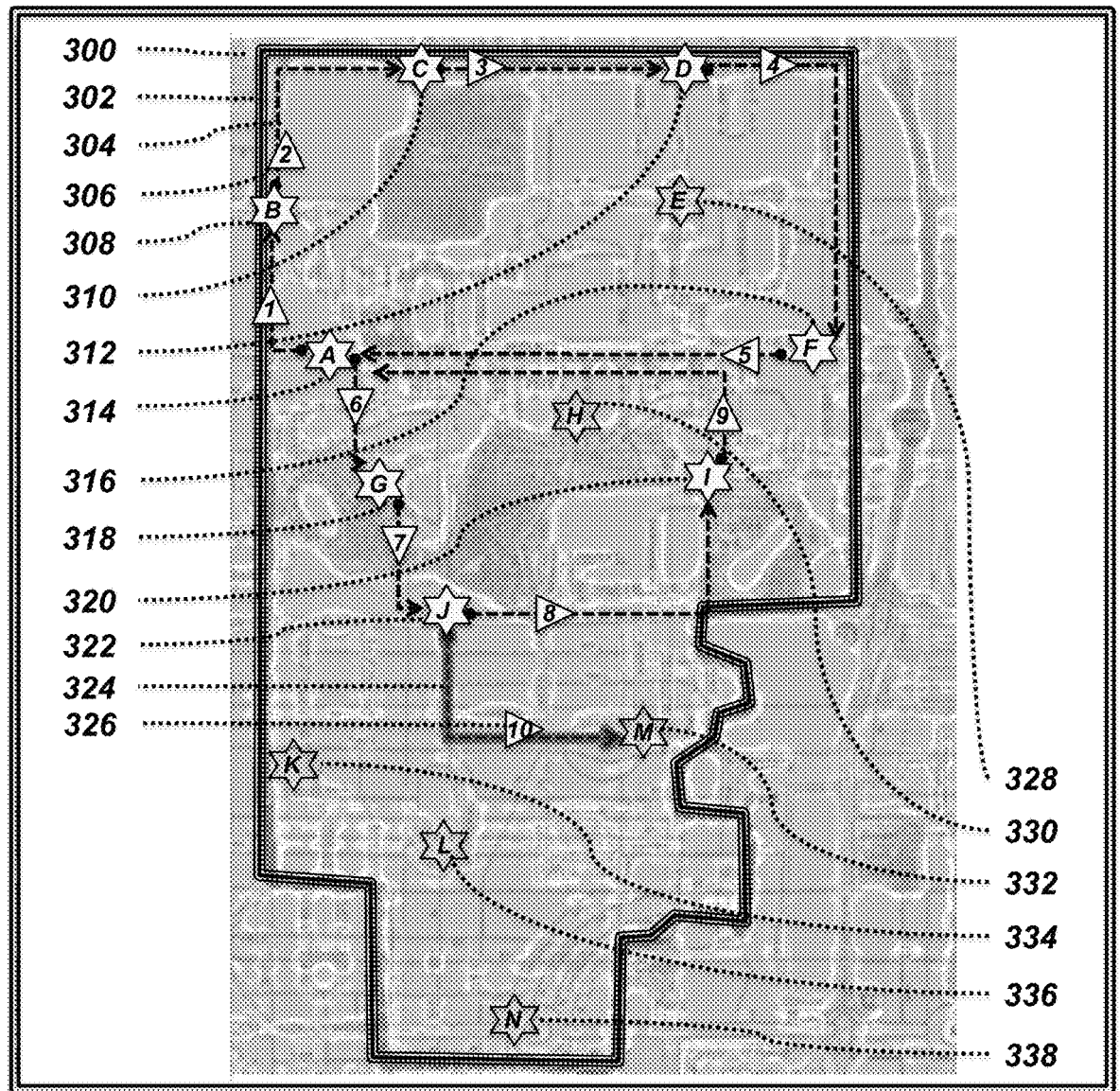
FIG. 3 is a diagram that depicts the geo-spatial representation of a program plan used by an autonomous robot or fleet of autonomous robots to transport people, products, and/or services from and to specific location(s), at specific time(s), and within a specific geographically boundary that are all pre-defined.

FIG. 3 is a diagram that depicts the geo-spatial representation of a program plan used by an autonomous robot or fleet of autonomous robots to transport people, products, and/or services from and to specific location(s), at specific time(s), and within a specific geographically boundary that are all pre-defined.

300: Geographic map is a representation of pre-defined area of operation for set program plan to include all regions defined with set by 102 Eruv which is a geographically boundary (or geo-fence) as managed by 122 The "Defined Autonomous Services Platform" (DASP).

302: Eruv as defined by 102 is a geographically boundary which acts as a Geo-fence that restricts operations only within set area as managed by 122 The "Defined Autonomous Services Platform" (DASP).

304: Designated road travel path from one Pickup/Drop-off location to another [i.e. #306/Site B to #308/Site C within FIG. 3] as defined by 106 which is a travel path is the planned set of roads, surfaces, aerial, and/or maritime route(s) to be travelled to get to or from one pre-defined location to another within 302 Eruv which is a geographically boundary (or geo-fence) that limits field activity or operations only within its area.

306: Designated road travel path identifier [i.e. 1, 2, 3, 4, 5, 6, 7, 8, and 9 within FIG. 3] as defined by 104 A travel path identification number that is a unique identifier that indicts a specific travel path to be travelled to or from one pre-defined location to another.

308, 310, 312, 314, 316, 318, 320, 322: Current Active Pickup/Drop-off location site(s) with pre-defined program [i.e. Site A, Site B, Site C, Site D, Site F, Site G, Site I, and Site J within FIG. 3] as defined by 108 point (start or destination location) are a pre-defined location within a travel path [i.e. A, B, C, D, E within FIG. 1], within 302 Eruv which is a geographically boundary (or geo-fence) that limits field activity or operations only within its area.

324: Future Designated road travel path as such as 304 Designated road travel path [i.e. #320/Site J to #328/Site M within FIG. 3] for a future planned set of roads, surfaces, aerial, and/or maritime route(s) to be travelled to get to or from one pre-defined location to another.

326: Future Designated road travel path identifier as such as 306 Designated road travel path identifier [i.e. #320/Site J to #328/Site M within FIG. 3]. 328, 330, 332, 334, 336, 338: Future Pickup/Drop-off location site(s) as defined by 108 point (start or destination location) to be used for a future possible pre-defined program(s) [i.e. Site E, Site H, Site K, Site L, Site M, and Site N within FIG. 3] which are destination points delineated by a set of geographic coordinates, or street address being also a pre-defined location within a travel path, within 302 Eruv which is a geographically boundary (or geo-fence) that limits field activity or operations only within its area.

FIG. 4 is a summary table that depicts detailed steps and system parameters of a program plan to used by an autonomous robot or fleet of autonomous robots to transport people, products, and/or services from and to specific location(s), at specific time(s), and within a specific geographically boundary that are all pre-defined.

400: Day of the calendar year when 122 The "Defined Autonomous Services Platform" (DASP), will execute the pre-defined program plan [i.e. Day in Gregorian and Hebrew Calendar formats].

402: Program Start Time is the time of the start for executing the pre-defined program plan so as to meet the 408 Target Time Complete [TTC] which is the pre-defined planned time for completion of the entire pre-defined program [i.e. based on localized time zone and the Shabbat Eve Time EST Zone-USA] managed by 122 The "Defined Autonomous Services Platform" (DASP).

404: Maximum Travel Speed [MTS] is the maximum speed of 100 an autonomous robot travel (in miles per hour or km per hour units) managed by 122 The "Defined Autonomous Services Platform" (DASP).

406: Stop Break Time (SBT) is the time (in minute units) for stopping following the completion of one defined Trip path within the pre-defined program plan managed by 122 The "Defined Autonomous Services Platform" (DASP).

408: Target Time Complete [TTC] is planned time of complete for the entire pre-defined program (i.e. Shabbat Eve EST Time Zone-USA) managed by 122 The "Defined Autonomous Services Platform" (DASP).

410: Program Itinerary based on 202 Create Program template to define a program based on technical parameters and service guidelines, which includes all Trip Travel Paths [i.e. there are 9 active Trip Paths Ids (412): 1, 2, 3, 4, 5, 6, 7, 8, 9 within FIG. 4] or 306 Designated road travel path identifier and actions to be Completed by 408 Target Time Complete [TTC] managed by 122 The "Defined Autonomous Services Platform" (DASP).

412: Trip Path ID (TPI) is the unique identifier [i.e. 1, 2, 3, 4, 5, 6, 7, 8, or 9 within FIG. 4] as such as 104 A travel path identification number or 306 Designated road travel path identifier, which is a single trip path within the pre-defined program managed by 122 The "Defined Autonomous Services Platform" (DASP).

414: Start Point ID (SPI1) is the unique identifier as such 108 An originating or destination location point, or such as 308, 310, 312, 314, 316, 318, 320, 322 Current Active Pickup/Drop-off location site(s), which is the starting destination point delineated by a set of geographic coordinates, or street address and is a pre-defined location within a travel path [i.e. A, B, C, D, F, G, J, I within FIG. 4] of the pre-defined program of a single trip path as such as within 410 Program Itinerary.

416: Stop Point ID (SPI2) is the unique identifier as such 108 An originating or destination location point, or such as 308, 310, 312, 314, 316, 318, 320, 322 Current Active Pickup/Drop-off location s site(s), which is the stopping destination point delineated by a set of geographic coordinates, or street address and is a pre-defined location within a travel path [i.e. A, B, C, D, F, G, J, I within FIG. 4] as such as within 410 Program Itinerary.

418: Trip Start Time (TST) is the time (based on localized time zone i.e. EST Time Zone-USA) for the start of the single trip path from 414 Start Point ID (SPI1) and 410 Program Itinerary.

420: Total Path Distance (TPD) is the total path distance (in miles or km units) for a single trip path as such as 412 Trip Path ID (TPI) and as such as within 410 Program Itinerary.

422: Cumulative Path Distance (CPD) is the cumulative path distance (in miles or km units) from the start of the single trip path within the pre-defined program plan, which is calculated by adding all, completed trip paths as such as relevant 420 Total Path Distance(s) (TPD) as such as within 410 Program Itinerary.

424: Actual Travel Time (ATT) is the total time (i.e. in minute units) that will elapse from the start of the single trip path within the pre-defined program and can be affected by the 404 Maximum Travel Speed [MTS] is the maximum speed for the autonomous robot travel (in miles per hour or km per hour units) as such as within 410 Program Itinerary.

426: Actual Cumulative Travel Time (ACTT) is the total actual cumulative time [i.e. in minute units] that will elapse and is determined by adding all time that elapsed during completed trip paths 424 Actual Travel Time (ATT) [i.e. in minute units] as such as within 410 Program Itinerary.

428: Trip Stop Time (TST2) is the time (i.e. based on localized time zone, EST Zone-USA) when arrived at the destination point within the pre-defined program and is can be calculated by the following: TST2=(TST+ATT/(24*60)] as such as within 410 Program Itinerary.

430: Process Action Type is the action to be completed during the trip stop time [i.e. Passenger=User Pickup or Drop-Off; Package=Item Pickup or Drop-off, etc.] as such as within 410 Program Itinerary.

432: Planned Stop Break Time (PSBT) is the total time [i.e. in minute units] for the stop break including break time and any other planned time for actions to occur during period as such as within 410 Program Itinerary.

434: Trip Complete Time (TCT2) is the time (i.e. based on localized time zone, EST Zone-USA) when the 432 Planned Stop Break Time (PSBT) is completed as such as within 410 Program Itinerary.

436: Total Cumulative Time (TCT) is the cumulative time [i.e. in minute units] that the entire trip path is completed during as such as within 410 Program Itinerary.

Figure 5:
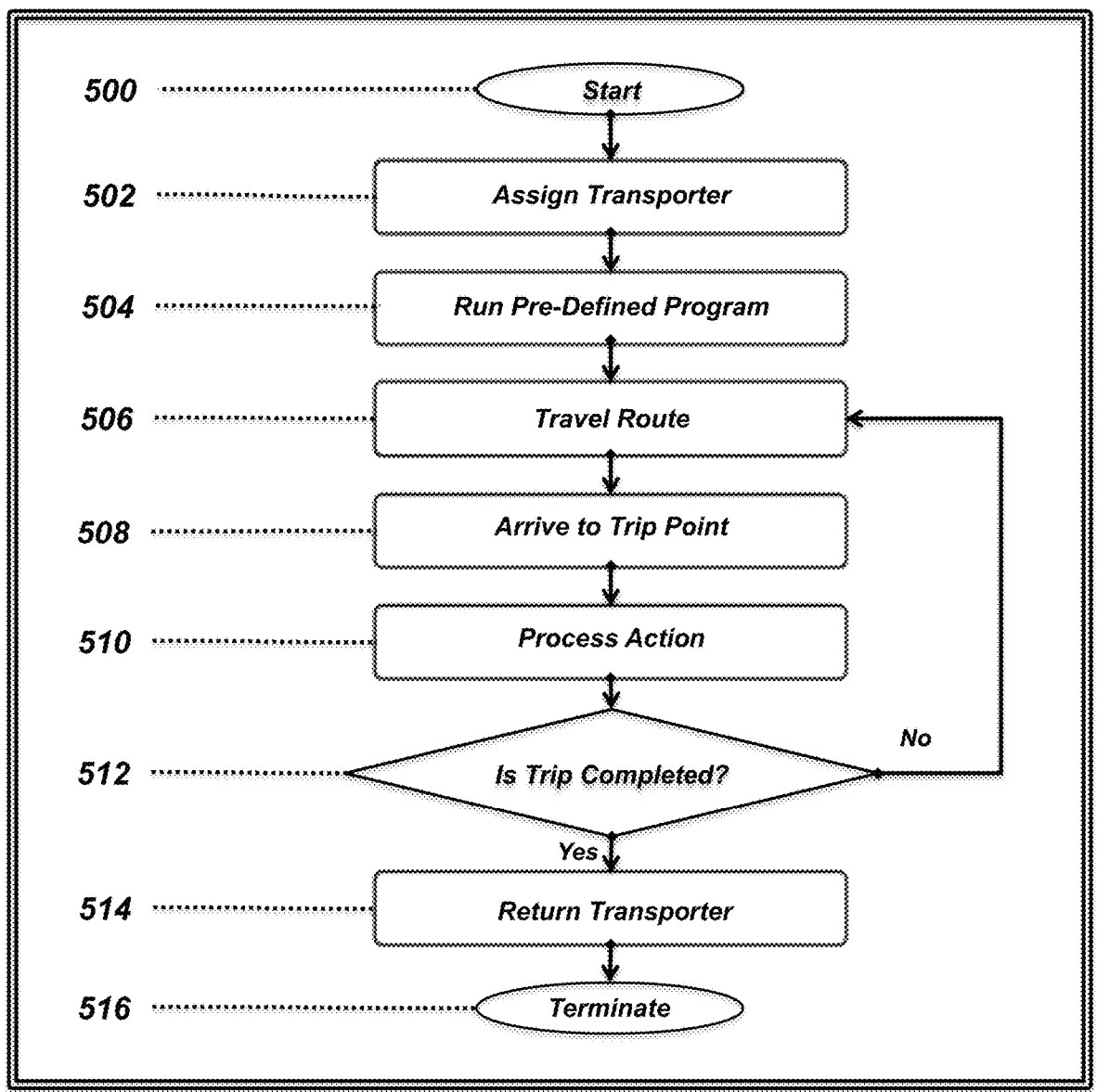
FIG. 5 is a process flow diagram that depicts how a program plan used by an autonomous robot or fleet of autonomous robots to transport people, products, and/or services from and to specific location(s), at specific time(s), and within a specific geographically boundary that are all pre-defined.

FIG. 5 is a process flow diagram that depicts how a program plan used by an autonomous robot or fleet of autonomous robots to transport people, products, and/or services from and to specific location(s), at specific time(s), and within a specific geographically boundary that are all pre-defined.

500: "Start" step initiates 122 The "Defined Autonomous Services Platform" (DASP) and 216 an activated program that will execute based on the 400 Day of the calendar year, 402 Program Start Time, and 410 Program Itinerary.

502: "Assign Transporter" step activates the 132 Transporter Fleet Manager to assign a transporter 100 autonomous robot or a fleet of autonomous robots resulting in delivery of transporter unit(s) from it's (their) docking location(s), or other pre-defined location(s) to the starting location 108 point(s) (starting or destination location) as such as 410 Program Itinerary delineated by the pre-defined program.

504: "Run Pre-Defined Program" step starts the process whereas the pre-defined program is initiating its assigned sub-components: 128 Trip & Action Planning Manager, 134 Path Planning Manager, 138 Energy & Power Manager, 140 User Id & Services Manager, 130 Payment Manager, 136 Operations & Maintenance Manager, 142 Field Support Services Manager, whereas 410 Program Itinerary is executed including all Trip Travel Paths [i.e. there are 9 Trip Paths with Ids: 1, 2, 3, 4, 5, 6, 7, 8, 9 within FIG. 4], Actions to be Completed by 408 Target Time Complete [TTC] of the pre-defined program.

506: "Travel Route" step whereas 504 Run Pre-Defined Program and its sub-components initiates the Transporter 100 autonomous robot travels the route from the initial to destination point as defined by 106 which is a travel path is the planned set of roads, surfaces, maritime, and/or aerial route(s) to be travelled to get to or from one pre-defined location to another as such as 410 Program Itinerary delineated by the pre-defined program.

508: "Arrive to Trip Point" step whereas 504 Run Pre-Defined Program and its sub-components initiates establishes for the Transporter 100 autonomous robots to arrive to the destination point 416: Stop Point ID (SPI2) as such as such as 410 Program Itinerary delineated by the pre-defined program.

510: "Process Action" step whereas 504 Run Pre-Defined Program and its sub-components initiates the Transporter 100 autonomous robot to process the action or set of action(s) to be completed as per 430 Process Action Type is the action to be completed during the trip stop time [i.e. Passenger=User Pickup or Drop-Off; Package=Item Pickup or Drop-off, etc.] as such as such as 410 Program Itinerary delineated by the pre-defined program and executed during the stop time.

512: "Is Trip Completed?" step whereas 504 Run Pre-Defined Program and its sub-components determines whether pre-defined program is completed; if complete then to next step 514 or if not completed proceed to continue pre-defined program 506.

514: "Return Transporter" step whereas the 132 Transporter Fleet Manager initiates the Transporter 100 autonomous robot or fleet of autonomous robots to travel from its current location(s) to another pre-defined location(s) delineated by the 122 The "Defined Autonomous Services Platform" (DASP).

516: "Terminate" step whereas the 122 The "Defined Autonomous Services Platform" (DASP) and its sub-components will complete the pre-defined program execution process.

Figure 6:
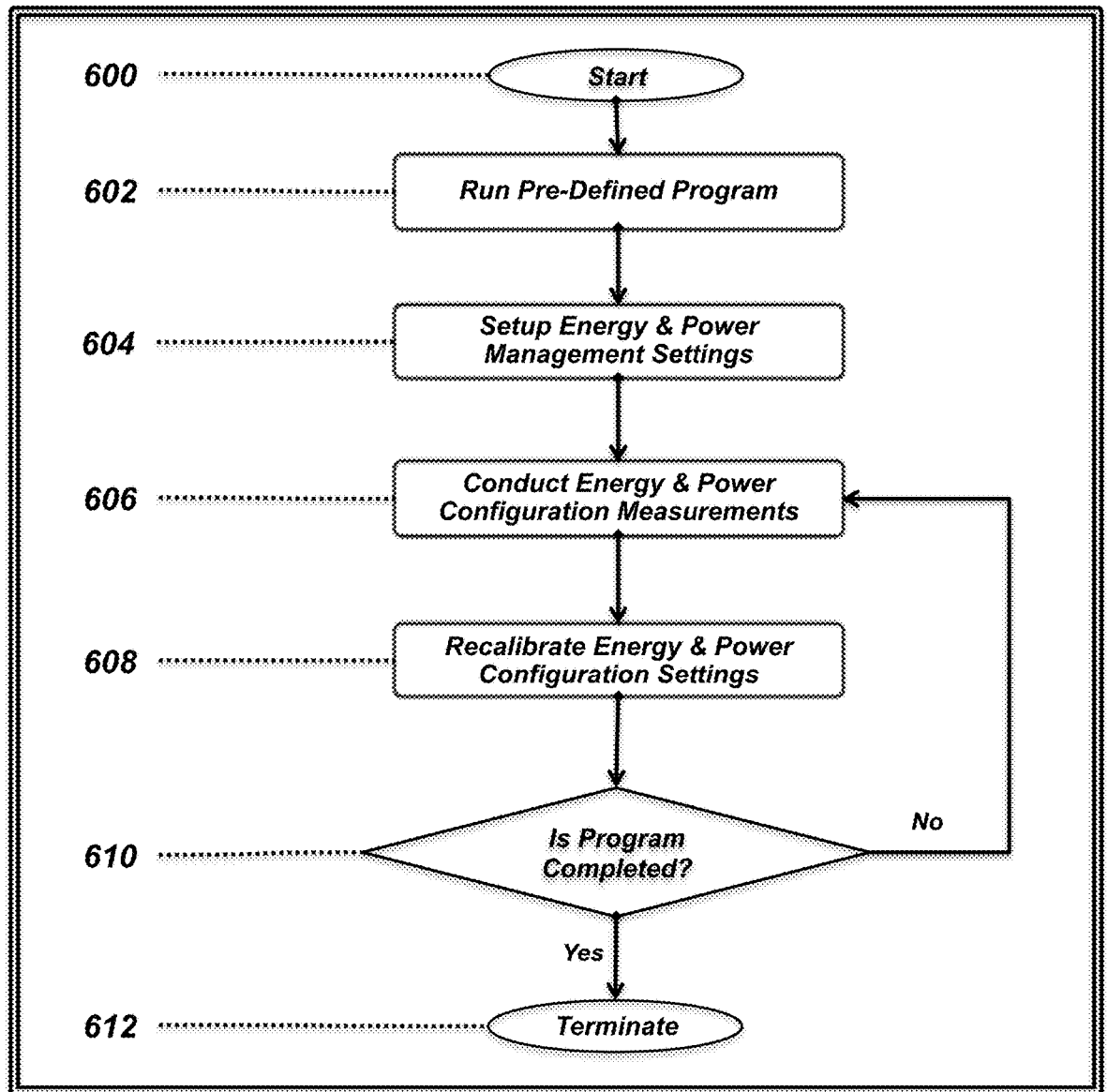
FIG. 6 is a process flow diagram that depicts energy and power management used by an autonomous robot or fleet of autonomous robots to transport people, products, and/or services from and to specific location(s), at specific time(s), and within a specific geographically boundary that are all pre-defined.

FIG. 6 is a process flow diagram that depicts energy and power management used by an autonomous robot or fleet of autonomous robots to transport people, products, and/or services from and to specific location(s), at specific time(s), and within a specific geographically boundary that are all pre-defined.

600: "Start" step initiates with the 122 The "Defined Autonomous Services Platform" (DASP).

602: "Run Pre-Defined Program" step starts the process whereas the pre-defined program is loaded to execute based on 504 Run Pre-Defined Program, whereas 410 Program Itinerary is executed including all Trip Travel Paths [i.e. there are 9 Trip Paths with Ids: 1, 2, 3, 4, 5, 6, 7, 8, 9 within FIG. 4], Actions to be Completed by 408 Target Time Complete [TTC] of the pre-defined program.

604: "Setup Energy & Power Management Settings" step whereas it will execute the pre-defined program as per its subset 138 Energy & Power Manager and 208 Configure Energy & Power Management.

606: "Conduct Energy & Power Configuration Measurements" step will conduct all necessary measurement readings from the autonomous robot or fleet of autonomous robot units as established on a regulated cycle as defined by 126 Program Policy Manager, and 138 Energy & Power Manager.

608: "Recalibrate Energy & Power Configuration Settings" step will institute all energy and power adjustments for operations of an autonomous robot or fleet of autonomous robot units as established by 126 Program Policy Manager, and 138 Energy & Power Manager.

610: "Is Trip Completed?" step determines whether 602 Run Pre-Defined Program step, the pre-defined is completed; if complete then to proceed to step 612 Terminate step or if not completed proceed to continue execution of the pre-defined program and 606 Conduct Energy & Power Configuration Measurements.

612: "Terminate" step whereas the 122: The "Defined Autonomous Services Platform" (DASP), will complete the pre-defined program execution process.

The invention claimed is:

1. A system for providing autonomous transportation or delivery services, the system comprising:
   system components for storing a plurality of instructions for implementing a transportation routine;
   a path planning manager for use in implementing the instructions and coupled to the system components for storing;
   at least one autonomous robot for transporting a person, product, or service; and
   processing circuitry coupled to the system components for storing and the path planning manager, the processing circuitry configured to execute the instructions to initiate at least one previously programmed transportation routine, the previously programmed transportation routine comprising:

locating one of the at least one autonomous robot at a first location, the first location defined within the path planning manager;

allowing pickup of a person, product, or service to the one autonomous robot at the first location;

transporting the person, product, or service to a second location along a predetermined route, the second location and the route being defined within the path planning manager; and allowing drop-off of the person, product, or service from the at least one autonomous robot at the second location, wherein no user intervention is accepted by the at least one autonomous robot after the transportation routine is initiated, and wherein the pickup and drop-off of the person, product, or service does not impact the behavior of the autonomous robot, wherein the plurality of instructions define two distinct operating modes, and wherein the path planning manager defines at least one restricted time period, and wherein:

the system operates in a first operating mode of the two distinct operating modes during the at least one restricted time period, and the system operates in a second operating mode of the two distinct operating modes outside of the at least one restricted time period, and wherein when operating in the first operating mode the system is limited to initiating only the at least one previously programmed transportation routine, and wherein, when operating in the first operating mode, a geographical boundary associated with the transportation routine is defined within the path planning manager as a geofence, and wherein the first location, the second location, and the entirety of the predetermined route are confined within the geofence, and wherein when operating in the second operating mode, the system executes instructions to initiate alternative transportation routines, wherein the alternative transportation routines authorize the at least one autonomous robot to accept user input after initiating a corresponding transportation routine, and wherein alternative transportation routines are not confined within the geofence.

2. The system of claim 1 further comprising a payment module, wherein the payment module applies a transactional activity payment upon or after initiating the at least one previously programmed transportation routine, wherein the transactional activity payment is authorized prior to initiating the previously programmed transportation routine, and wherein the payment is completed without any user input after the initiating the previously programmed transportation routine.

3. The system of claim 1 further comprising a power management module, wherein the power management module defines a power expenditure rate of the at least one autonomous robot during the transportation routine prior to the initiation of the transportation routine, wherein the power expenditure rate is maintained at a constant level from the initiation of the transportation routine until after allowing the drop-off of the person, product, or service from the at least one autonomous robot at the second location, and wherein the power expenditure rate during the transportation routine is independent of a velocity of the autonomous robot or a weight of the person, product, or service being transported.

4. The system of claim 3, wherein the power expenditure rate during the transportation routine is maintained and source voltages, currents, and resistances are actively managed without creating, opening, or closing electrical circuits.

5. The system of claim 1, wherein the instructions further comprise instructing the autonomous robot to authenticate the person, product, or service by implementing a passive authentication routine.

6. The system of claim 1 further comprising a payment module, wherein the payment module applies a transactional activity payment or fee upon or after initiating the at least one previously programmed transportation routine, and wherein the transactional activity payment is authorized prior to an at least one restricted time period and wherein the transportation routine is executed during the restricted time period, and wherein the payment is completed without any user input after the initiating of the transportation routine.

7. The system of claim 1 further comprising a power management module, wherein when operating in the first operating mode, the power management module defines a power expenditure rate of the at least one autonomous robot during the transportation routine prior to the initiation of the transportation routine, and wherein the power expenditure rate is maintained at a constant level from the initiation of the transportation routine until after allowing the drop-off of the person, product, or service from the at least one autonomous robot at the second location, and wherein when operating in the second operating mode, the power management module does not define a power expenditure rate.

8. The system of claim 1, wherein the at least one autonomous robot is a passenger vehicle, delivery van, commercial truck, robot unit, unmanned arial vehicle, or a drone.

9. A method for providing autonomous transportation or delivery services, the method comprising:

defining at least one restricted time period, wherein the system operates in a first operating mode of two distinct operating modes during the at least one restricted time period, and the system operates in a second operating mode of the two distinct operating modes outside of the at least one restricted time period;

initiating a transportation routine from a set of at least one previously programmed transportation routines:

locating an autonomous robot at a first location, the first location defined prior to initiation of the transportation routine;

allowing pickup of a person, product, or service to the one autonomous robot at the first location;

transporting, by the autonomous robot, the person, product, or service to a second location along a predetermined route, the second location and the route being defined prior to initiation of the transportation routine; and allowing drop-off of the person, product, or service from the at least one autonomous robot at the second location, wherein, when in the first operating mode, only transportation routines selected from the set of previously programmed transportation routines can be initiated; and wherein, when in the second operating mode, alternative transportation routines can be initiated, wherein no user input is accepted by the autonomous robot after the at least one previously programmed transportation routine is initiated, and wherein the pickup and drop-off of the person, product, or service does not impact the behavior of the autonomous robot when operating in the first operating mode, and wherein the alternative transportation routines authorize the autonomous robot to accept user input after initiating a corresponding transportation routine, and wherein, when in the first operating mode, a geographical boundary associated with the previously programmed transportation routine is defined as a geofence, and the first location, the second location, and the entirety of the predetermined route are confined within the geofence, and wherein, when in the second operating mode, alternative transportation routines are not confined within the geofence.

10. The method of claim 9 further comprising applying a transactional activity payment upon or after initiating the at least one previously programmed transportation routine, wherein the transactional activity payment is authorized prior to initiating the previously programmed transportation routine, and wherein the payment is completed without any user input after the initiating of the previously programmed transportation routine.

11. The method of claim 9 further comprising:

defining prior to the initiation of the transportation routine, by a power management module, a power expenditure rate for the at least one autonomous robot, wherein the power expenditure rate is maintained at a constant level from the initiation of the transportation routine until after allowing the drop-off of the person, product, or service from the at least one autonomous robot at the second location, and wherein the power expenditure rate during the transportation routine is independent of a velocity of the autonomous robot or a weight of the person, product, or service being transported.

12. The method of claim 11, wherein the power expenditure rate during the transportation routine is maintained and source voltages, currents, and resistances are actively managed without creating, opening, or closing electrical circuits.

13. The method of claim 9, wherein the autonomous robot authenticates the person, product, or service by implementing a passive authentication routine.

14. The method of claim 9, further comprising applying a transactional activity payment upon or after initiating the at least one previously programmed transportation routine, and wherein the transactional activity payment is authorized prior to an at least one restricted time period and wherein the transportation routine is executed during the restricted time period, and wherein the payment is completed without any user input after the initiating of the transportation routine.

15. The method of claim 9, wherein:

when operating in the first operating mode, defining prior to the initiation of the transportation routine, a power expenditure rate for the at least one autonomous robot, wherein the power expenditure rate is maintained at a constant level from the initiation of the transportation routine until after allowing the unloading of the person, product, or service from the at least one autonomous robot at the second location, and wherein a power expenditure rate is not defined when operating in the second operating mode.

16. The method of claim 9, wherein the at least one autonomous robot is a passenger vehicle, delivery van, commercial truck, robot unit, unmanned arial vehicle, or a drone.

17. A method for providing autonomous transportation or delivery services, the method comprising:

defining at least one restricted time period, wherein the system operates in a first operating mode of two distinct operating modes during the at least one restricted time period, and the system operates in a second operating mode of the two distinct operating modes outside of the at least one restricted time period, initiating a transportation routine from a set of at least one previously programmed transportation routines:

locating an autonomous robot at a first location, the first location defined prior to initiation of the transportation routine;

allowing pickup of a person, product, or service to the one autonomous robot at the first location;

transporting, by the autonomous robot, the person, product, or service to a second location along a predetermined route, the second location and the route being defined prior to initiation of the transportation routine; and allowing drop-off of the person, product, or service from the at least one autonomous robot at the second location, wherein, when in the first operating mode, only transportation routines selected from the set of previously programmed transportation routines can be initiated; and wherein, when in the second operating mode, alternative transportation routines can be initiated, wherein no user input is accepted by the autonomous robot after the at least one previously programmed transportation routine is initiated, and wherein the pickup and drop-off of the person, product, or service does not impact the behavior of the autonomous robot when operating in the first operating mode, and wherein the alternative transportation routines authorize the autonomous robot to accept user input after initiating a corresponding transportation routine, and wherein, when in the first operating mode, a transactional activity payment is applied after initiating the at least one previously programmed transportation routine, wherein the transactional activity payment is authorized prior to initiating the previously programmed transportation routine, and wherein the payment is completed without any user input after the initiating of the previously programmed transportation routine, and wherein, when in the second operating mode, payment is completed only after receiving user confirmation that such payment should be applied.

* * * * *